T. E. BARNUM.
DRUM CONTROLLER.
APPLICATION FILED AUG. 21, 1916.

1,322,996.

Patented Nov. 25, 1919.
2 SHEETS—SHEET 1.

INVENTOR.
Thomas E. Barnum
BY
Frank H. Hubbard
ATTORNEY

T. E. BARNUM.
DRUM CONTROLLER.
APPLICATION FILED AUG. 21, 1916.

1,322,996.

Patented Nov. 25, 1919.
2 SHEETS—SHEET 2.

INVENTOR.
Thomas E. Barnum
BY Frank H. Hubbard
ATTORNEY

UNITED STATES PATENT OFFICE.

THOMAS E. BARNUM, OF MILWAUKEE, WISCONSIN, ASSIGNOR TO THE CUTLER-HAMMER MFG. CO., OF MILWAUKEE, WISCONSIN, A CORPORATION OF WISCONSIN.

DRUM-CONTROLLER.

1,322,996. Specification of Letters Patent. Patented Nov. 25, 1919.

Application filed August 21, 1916. Serial No. 116,005.

*To all whom it may concern:*

Be it known that I, THOMAS E. BARNUM, a citizen of the United States, residing at Milwaukee, in the county of Milwaukee and State of Wisconsin, have invented new and useful Improvements in Drum-Controllers, of which the following is a full, clear, concise, and exact description, reference being had to the accompanying drawing, forming a part of this specification.

This invention relates to drum controllers and is particularly applicable to those employed for regulating electric motors.

In the control of motors it is frequently desired to provide for reverse operations of the same and to provide for both armature and field regulation thereof. Also, it is sometimes desired to provide for the establishment of dynamic braking connections and it has been found that the necessarily limited movement of a reversing drum controller is often inadequate for the desired number of steps of control and particularly for field regulation.

The present invention contemplates a drum controller for the aforesaid and other purposes and has among its objects to provide for an increased number of control steps for a given angular movement of the drum section.

A further object is to provide a drum controller to effect the regulation described, wherein the field regulating means will remain inert during armature regulation to thereby insure against field weakening during such time and enable the use of the full range of movement of said means for regulating purposes.

A further object is to provide a drum controller wherein the field regulating means will effect field weakening in neutral position of said controller and field strengthening prior to establishment of starting connections.

Other objects and advantages will hereinafter appear.

In the accompanying drawing, wherein is illustrated an embodiment of the said invention, Figure 1 is a front elevation view, partly in section, of the controller.

Fig. 2 is a horizontal section on line 2—2 of Fig. 1, while.

Figure 1:
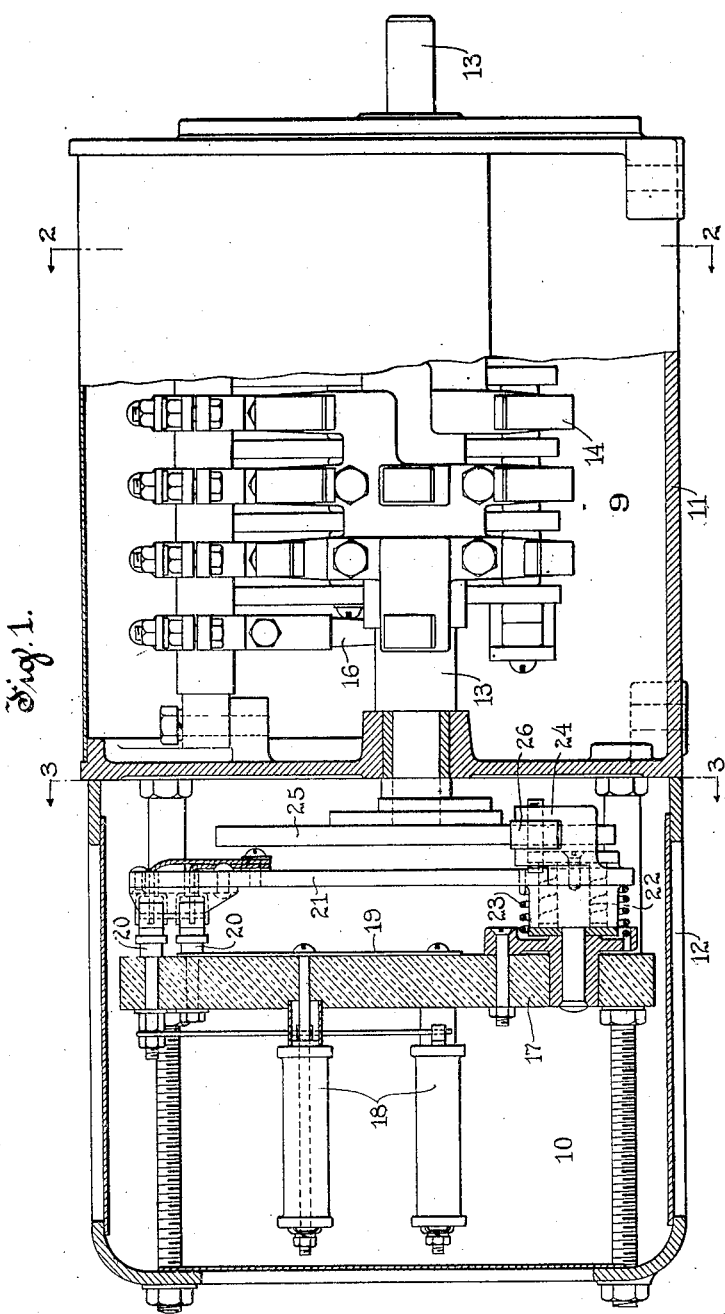

Referring to the drawing, and particularly to Fig. 1, the controller comprises a drum section 9 and a field rheostat section 10, the said sections being respectively inclosed within separable housings 11, 12 and being operatively connected for joint actuation by a controller shaft 13.

Figure 2:
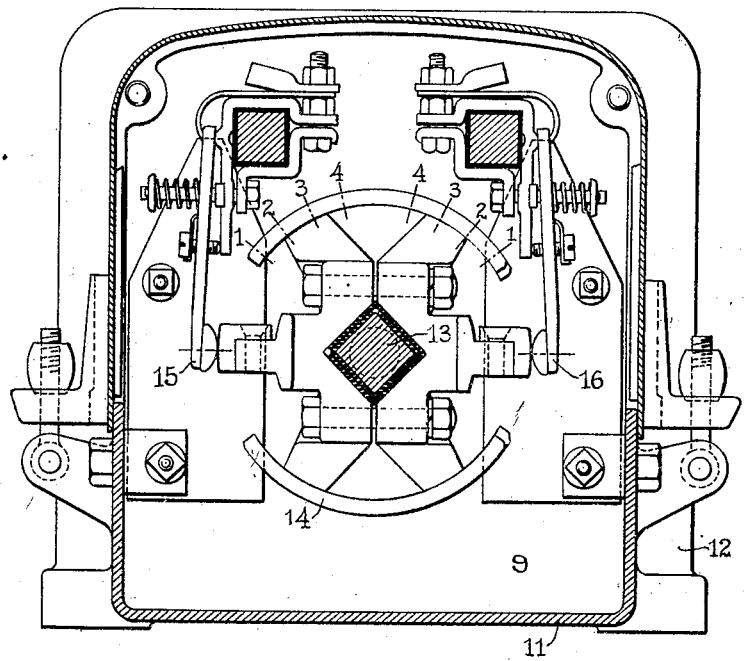

The drum section 9, which is of known construction and is illustrated particularly in Fig. 2, comprises a contact drum 14 mounted upon and insulated from the controller shaft 13 and movable therewith for selective coöperation with suitable stationary contacts 15, 16 to establish the various armature connections necessary for starting and accelerating the motor in either direction and for dynamic braking.

The drum 14 is displaceable in either direction from the neutral or braking position, shown in Fig. 2, for selectively establishing forward and reverse running connections for the controlled motor. The positions indicated by numerals 1—4 correspond respectively to a starting position and three progressive resistance excluding positions for acceleration, the above positions being duplicated on the opposite side of the neutral position for reverse operation.

As illustrated, the contact drum is displaceable through aproximately 140° on either side of the neutral position for control purposes. Of the above displacement, 40° is allowed for interruption of the braking circuit and establishment of starting connections, while 12° is allowed for each of the resistance excluding steps. This allows a total of 76° for starting and accelerating and in consequence leaves less than 70° for field regulation, which amount is often found inadequate to provide for the desired number of steps of field resistance of which approximately 20 are frequently employed. As will be understood, the limitation of the controller to 140° available movement in either direction is due to the allowance of 40° between neutral and starting positions, which in view of the reversibility of the controller necessarily results in a corresponding loss of 40°.

The rheostat comprises an insulating panel 17 and resistance units 18 mounted thereon and connected by conductors 19 to a suitable series of contacts 20. The said contacts are arranged for selective engagement by a rheostat arm 21 pivoted at 22 and operable through a range relatively greater than the corresponding travel of the drum section to respectively exclude and include steps of resistance when moved in a counter-clockwise or a clockwise direction. A helical spring 23 coiled about the pivot 22 of rheostat arm 21 serves to bias the same to its resistance including position. This rheostat is more fully disclosed in a copending application filed Feb. 21, 1916, Serial No. 79,663, by L. L. Tatum allowed April 11, 1916, and the specific details thereof form no part of the present invention.

The rheostat section 10 is mounted within its casing 12 below the drum section and is operatively connected thereto by means of a roller extension 24 on the rheostat arm 21 adapted to be engaged by a cam 25 which is fast upon and insulated from the drum shaft 13.

The cam 25 is adapted to insure positioning of the rheostat arm in an intermediate relation while the contact drum occupies its neutral position, thereby insuring field weakening while the motor is at rest. The cam operates, upon displacement of said drum in either direction from said neutral position, to actuate said rheostat arm to exclude all field resistance prior to the establishment of motor starting connections and to retain said arm in its resistance excluding position during movement of said drum in either direction for motor acceleration, thus insuring a strong field for starting and accelerating the motor. Upon further displacement of said drum in either direction beyond its range of acceleration, the cam permits resistance including movement of said rheostat arm and through a range of travel relatively greater than the remaining travel of the drum.

For convenience of description the active surface of the cam 25 has been indicated as divided into segments $a$, $b$, $c$, $d$, $e$, $f$, each segment corresponding to a given angular travel of the contact drum.

Figure 3:
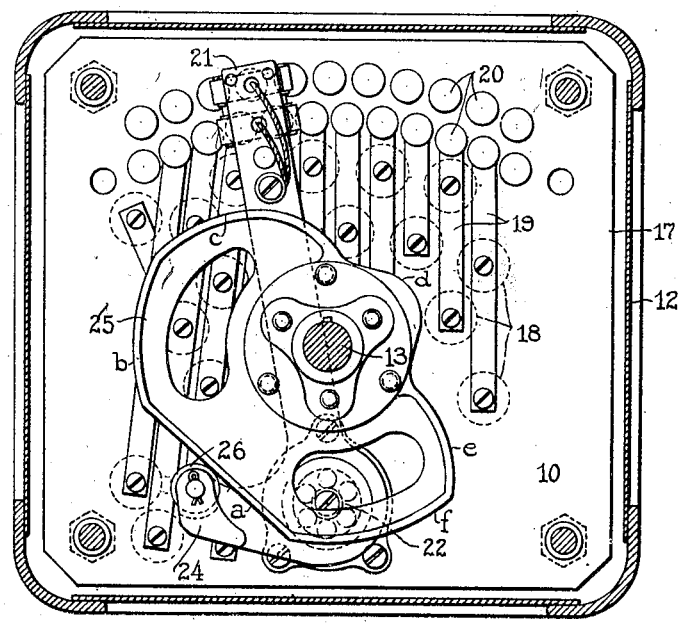
Fig. 3 is a similar view on line 3—3, Fig. 1.

In Fig. 2 the contact drum is shown in its neutral position while in Fig. 3 the cam 25 is shown in its position corresponding thereto, with the segment $a$ in coöperation with roller 26 of the rheostat arm and a predetermined number of steps of resistance included for field weakening as above described. As the drum is moved counter-clockwise to the first running position, as indicated in Fig. 2, the cam moves therewith causing the surface of the segment $a$ to pass beneath the roller 26 whereby the rheostat arm is drawn to the left against the opposition of the spring 23 for excluding all of the field resistance, the extent of the segment $a$ being such that all field resistance is excluded prior to closure of the armature circuit, thus insuring a strong field for starting the motor. As the drum is further moved counter-clockwise through the second, third and fourth running positions, the surface of the segment $b$ passes beneath the roller 26. This segment being approximately concentric with the axis of the cam the rheostat arm is maintained in its extreme resistance excluding position, thereby maintaining the strength of the field while the motor is being brought up to speed. The fourth running position of the drum corresponds with the junction between segments $b$ and $c$ of the cam. Therefore further movement of the drum in the same direction causes segment $c$ to coöperate with the rheostat roller. This segment leads inward toward the axis of the cam whereby in traversing the same the roller moves to the right, thus permitting the rheostat arm also to move in a clockwise direction in response to its bias, thereby including successive steps of the field resistance until movement of the drum is arrested or until the roller coöperates with the portion of the cam surface represented by the junction of segments $c$ and $d$, in which position the total field resistance is included in circuit.

Upon subsequent movement of the drum in a reverse direction the above described steps take place in inverse order until the drum stands in the off position illustrated with the cam in its corresponding position.

Further movement of the drum to the right causes starting and acceleration of the motor in precisely the manner above described but in the opposite direction, together with the corresponding field regulation, also as above described.

The cam segments $b$, $c$ are in general similar to the corresponding segments $f$, $e$ but differ slightly therefrom in size and contour by reason of the inverse order of their engagement. The short segment $d$ is practically inactive, there being no active position of the drum corresponding thereto.

From the above description it is obvious that all the desired steps of field regulation are accomplished through actuation of the drum controller shaft. It is furthermore apparent that failure of the spring 23 in no wise affects the operation of the drum controller or the safety of the motor, the only result being that field weakening under those conditions may not be accomplished.

What I claim as new and desire to secure by Letters Patent is:

1. In a drum controller, the combination with a drum section, of a control device having an element movable through a given range and means to normally position the latter between limits and to effect reverse movements thereof upon unidirectional movement of said drum section.

2. In a drum controller, the combination with a drum section movable in opposite directions from a neutral position, of a control device having an element movable through a given range and means to position the latter between limits when said drum section occupies neutral position and to effect reverse movements of said element upon movement of said drum section through a given range in either direction from neutral position.

3. In a drum controller, the combination with a drum section movable in opposite directions from a neutral position, of a control device having a movable element and means for effecting reverse movements of the latter upon movement of said drum section through a given range in either direction from neutral position.

4. In a drum controller, the combination with a drum section, of a control device having an element movable through a given range and means to normally position the latter between limits and to effect reverse movements thereof upon unidirectional movement of said drum section, said means necessitating movement of said drum section through a given range after initial movement of said element and before reversal thereof.

5. In a drum controller, the combination with a drum section, of a control device having an element movable through a given range and means to normally position the latter in an intermediate position and to effect reverse movements thereof upon unidirectional movement of said drum section, said means necessitating movement of said drum section through a given range after initial movement of said element and before reversal thereof and insuring operation of said element through a given range upon movement of said drum section through a lesser range.

6. In a drum controller, the combination with a drum section movable in opposite directions from a neutral position, of a control device having an element movable through a given range, of means normally positioning the latter in an intermediate position and effecting movement of said element to one extreme position upon initial movement of said drum section in either direction and thereafter effecting reverse movement of said element upon continued movement of said drum section in the same direction, said means further effecting an angular movement of said element exceeding the corresponding angular movement of said drum section.

7. In a drum controller, the combination with a drum section movable in opposite directions from a given position, of a control device having an element movable through a given range and means positioning said element in an intermediate position when said drum section occupies neutral position, said means effecting angular movement of said element exceeding the corresponding angular movement of said drum section and effecting operation of said element to one extreme position upon movement of said drum section in either direction from neutral position, then arrest of said element during a predetermined continued movement of said drum section and then reverse movement of said element to its other extreme position upon further continued movement of said drum section.

8. In a motor controller, the combination with a reversing and accelerating drum movable in opposite directions from a neutral position, of a field rheostat having a movable element and means for effecting operation of the latter unidirectionally during a given movement of said drum in either direction and through a range relatively greater than the corresponding angular movement of said drum.

9. In a motor controller, the combination with a reversing and accelerating drum movable in opposite directions from a neutral position, of a field rheostat having an element movable through a given range and means to position the latter between limits when said drum occupies neutral position, and to effect angular movement of said element exceeding the corresponding angular movement of said drum, said means insuring operation of said element in one direction upon initial movement of said drum in either direction, arrest of said element during a predetermined continued movement of said drum and reverse movement of said element during further continued movement of said drum.

10. In a motor controller, the combination with a reversing and accelerating drum movable in opposite directions from a neutral position, of a field rheostat having a movable element and means to insure unidirectional operation of said element during approach of said drum to either limit and through a range relatively greater than the corresponding range of movement of said drum.

11. In a motor controller, the combination with a reversing and accelerating drum movable in opposite directions from a neutral position, of a field rheostat having a movable element and means for insuring positioning of said element between limits when said drum is in neutral position, and movement of said element to one limit upon initial movement of said drum in either direction and during continued movement of the latter through a given range and further insuring a multiplied uni-directional movement of said element toward its other limit, upon continued movement of said drum beyond such range.

12. In a motor controller, the combination with an accelerating drum having a neutral position, of a field regulator including a resistance and a control element therefor, and means to insure inclusion of resistance by said element when said drum is in neutral position and the exclusion of all of said resistance upon initial movement of said drum from neutral position and during continued movement of the latter throughout a given range, said means further insuring movements of said element relatively greater than the corresponding movements of said drum.

13. In a motor controller, the combination with a reversing and accelerating drum movable in opposite directions from a neutral position, of a field regulator including a resistance and a control element therefor, and means to insure inclusion of a given amount of said resistance when said drum is in neutral position, exclusion of all of said resistance upon movement of said drum in either direction through a given range and inclusion of said resistance gradually upon further movement of said drum.

14. In a motor controller, the combination with an accelerating drum having a neutral position, of a field regulator including a resistance and a control element therefor, and means insuring inclusion of a portion of said resistance by said element when said drum is in neutral position, exclusion of all of said resistance by said element upon initial movement of said drum from said neutral position and during continued movement throughout a given range and gradual reinclusion of said resistance upon a further movement of said drum.

In witness whereof, I have hereunto subscribed my name.

THOMAS E. BARNUM.